United States Patent [19]

Szuminski et al.

[11] Patent Number: 4,739,932

[45] Date of Patent: Apr. 26, 1988

[54] PROPULSION NOZZLE FOR GAS TURBINE ENGINE

[75] Inventors: Gary F. Szuminski; Charles R. Pearson, both of Marietta, Ga.

[73] Assignee: Rolls-Royce Inc., Greenwich, Conn.

[21] Appl. No.: 909,024

[22] Filed: Sep. 18, 1986

[51] Int. Cl.[4] .......................... B64C 9/38; B64C 15/00
[52] U.S. Cl. ........................ 239/265.33; 239/265.19; 239/265.37; 60/230
[58] Field of Search .................. 244/12.4, 23 R, 23 P; 60/228, 230; 239/265.11, 265.19, 265.33, 265.37, 265.39

[56] References Cited

U.S. PATENT DOCUMENTS

| | | | |
|---|---|---|---|
| 4,000,854 | 7/1977 | Konarski | 239/265.35 |
| 4,456,203 | 6/1984 | Louthan | 239/265.9 X |
| 4,638,946 | 1/1987 | Hall | 239/265.33 |

FOREIGN PATENT DOCUMENTS 2098280  11/1982  United Kingdom ........... 239/265.35

*Primary Examiner*—Andres Kashnikow
*Assistant Examiner*—Kevin Patrick Weldon
*Attorney, Agent, or Firm*—Cushman, Darby & Cushman

[57] ABSTRACT

A propulsion nozzle of a gas turbine engine comprising two mutually confronting spaced fixed side walls 14, 16 and two upper and lower mutually confronting spaced movable walls 20, 22 which locate and move in trackways 18 in the side walls. The movable walls 20, 22 each comprise a plurality of pivotally interconnected members which extend transverse to the fixed walls to define a convergent part and throat of the nozzle.

A flap 28 is pivotally connected at its upstream end to a downstream end of one of the movable walls 20(b) and is operable, in at least one mode of operation, to cooperate with the fixed walls to define a divergent expansion ramp downstream of the throat of nozzle. In a first mode of operation, the movable walls 20, 22 can be moved along the trackway 18 to cause the members to define a con-di nozzle facing rearwards to produce forward thrust. In a second mode of operation, the members define a convergent nozzle facing in a direction which is angled relative to a direction facing rearwards thereby to vector the direction of thrust.

4 Claims, 3 Drawing Sheets

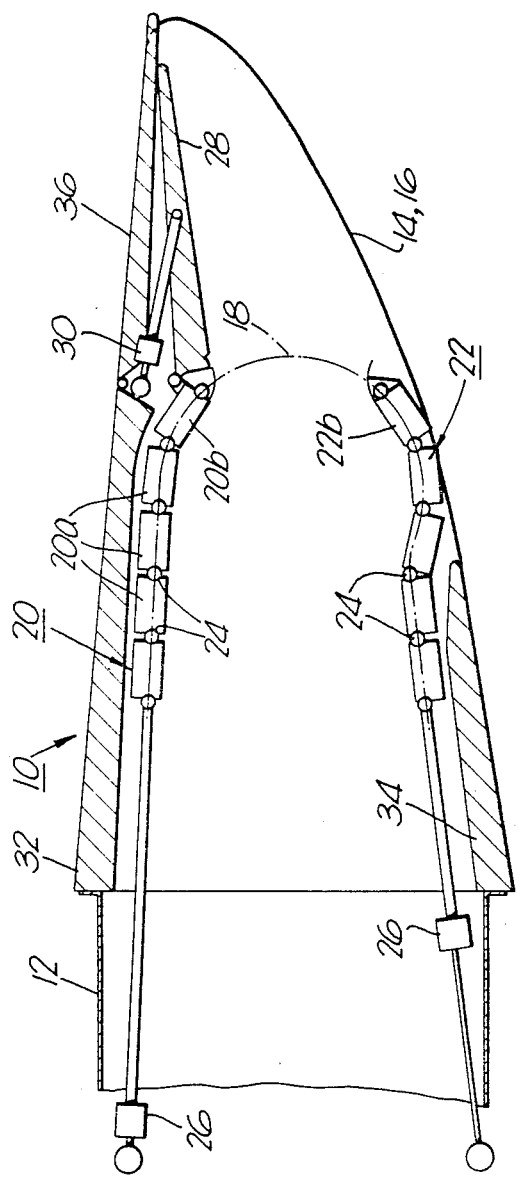
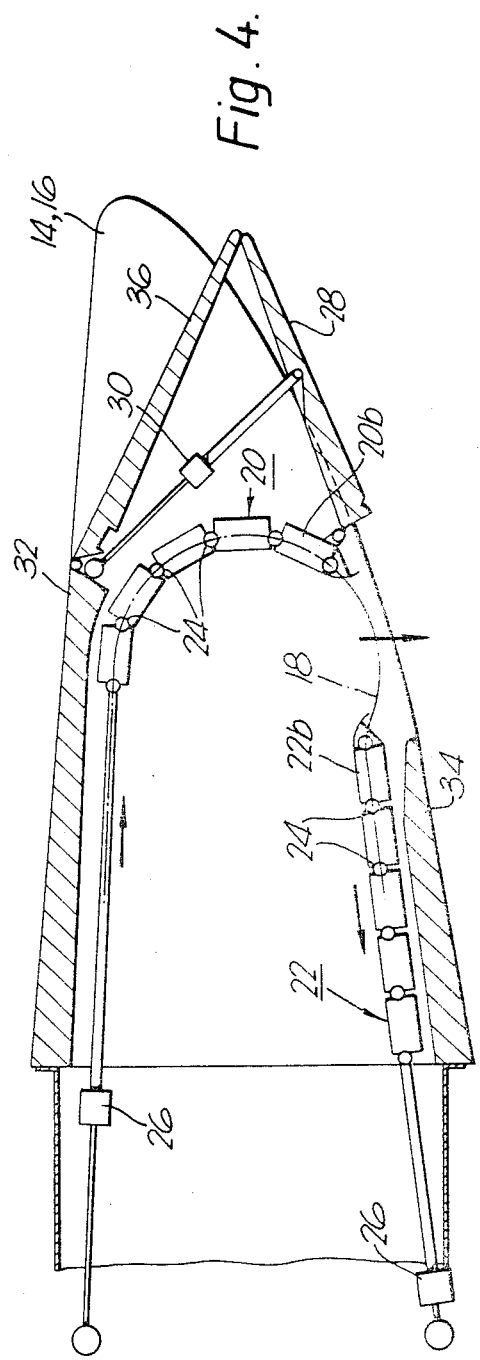

PROPULSION NOZZLE FOR GAS TURBINE ENGINE

This invention relates to propulsion nozzles for gas turbine aero-engines, and in particular to nozzles which can be operated to change the direction of discharge from the nozzle so as to vector the thrust produced by the engine.

There is a need for an aircraft which can fly forward at high speeds and also take off, or land, vertically. This requirement can be met with vectorable nozzles, similar to those employed on the British Aerospace Harrier, or AV8B, aircraft. The vectorable nozzles of these aircraft can be rotated from a first position of these aircraft can be rotated from a first position where they discharge rearwards for forward thrust, to a second position where they discharge downwards, for upwards thrust.

With some future designs of aircraft there is also the need to be able to control the attitude of the aircraft during forward flight by being able to vector the nozzles slightly upwards or downwards, (for example 20°) relative to a horizontal position. A nozzle with the capability of vectoring through 90° or more for vertical flight and also capable of limited vectors up to say 20° relative to a position for horizontal flight would also improve the manoevrability during combat.

Many designs of nozzles are what are called "convergent" nozzles, that is to say that the jet pipe of the engine converges towards a smaller area fixed exit and the maximum thrust produced is that when the mass-flow through the nozzles is the maximum for the outlet area of the nozzle. The nozzle is then said to be choked. Any increase in mass flow to the nozzle would result in an unacceptable back pressure at the exit of the turbines and a stall or surge would result.

There is a need for supersonic aircraft with vertical take-off and landing capability (VTOL). The design of nozzle has to be matched with the widely varying mass flow requirements and increased thrust required. To a certain extent these wider requirements can be met by redesigning convergent nozzles to maintain supersonic flow through the nozzle at maximum thrust.

However, there are also designs of nozzles which have an exit area defined by a throat formed between an upstream convergent region and a downstream divergent region. In the design of these nozzles the maximum thrust is produced with choked flow but with higher pressures through the nozzle. Additional thrust is recovered by the reaction of the expanding pressurised gasses downstream of the throat acting on the divergent region. Convergent-divergent nozzles, as these are sometimes called, (usually abbreviated to "con-di" nozzles), can provide a significant increase in thrust at the expense of greater weight, more complexity and more costly manufacture.

Conventional convergent-divergent nozzles are complex and heavy enough without building in the requirement of vectoring the nozzle in the manner discussed above.

One design of nozzle which is of simplified design and is relatively inexpensive compared with some designs of convergent nozzle, is described in British Pat. No. 2146298. In essence, the nozzle described in this Patent consists of a rectangular section nozzle having two spaced sidewalls which incorporate various shaped trackways and upper and lower walls each of which consist of a plurality of slats hinged together; the slats run in the trackways and are pulled by cables to assume different positions along the trackways.

The above mentioned patent contemplates that the slatted walls can be used to define a convergent nozzle (see for example FIGS. 6 and 7) a divergent nozzle (FIG. 8) or a vectored thrust nozzle (figure 10). However, none of the envisaged nozzles are con-di nozzles and there is no way of being able to change the direction of thrust of a con-di nozzle.

An object of the present invention is to provide a design of convergent-divergent nozzle which is able to be vectored to change the direction of discharge from the nozzle and hence vary the direction of propulsive thrust.

The present invention will now be described by way of example with reference to the accompanying drawings in which:

FIG. 1 illustrates schematically one design nozzle constructed in accordance with the present invention.

FIG. 4 is a side view of the nozzle of FIG. 1 showing the nozzle in the vectored thrust position.

Figure 2:
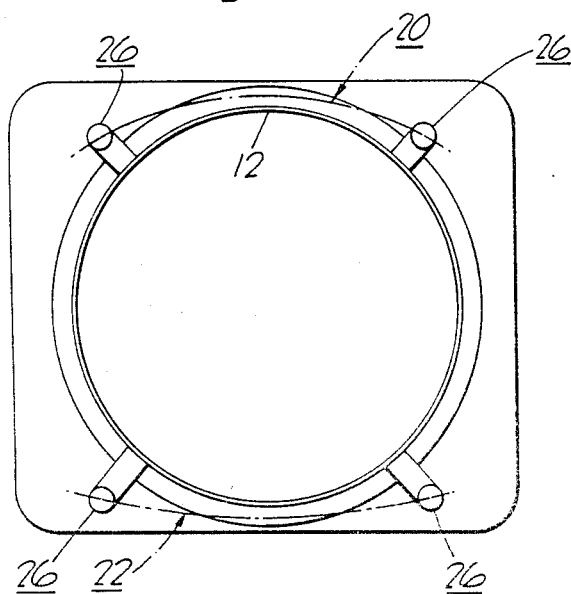
FIG. 2 is a cross-sectional view of the nozzle of FIG. 1 looking aft.
Figure 3:
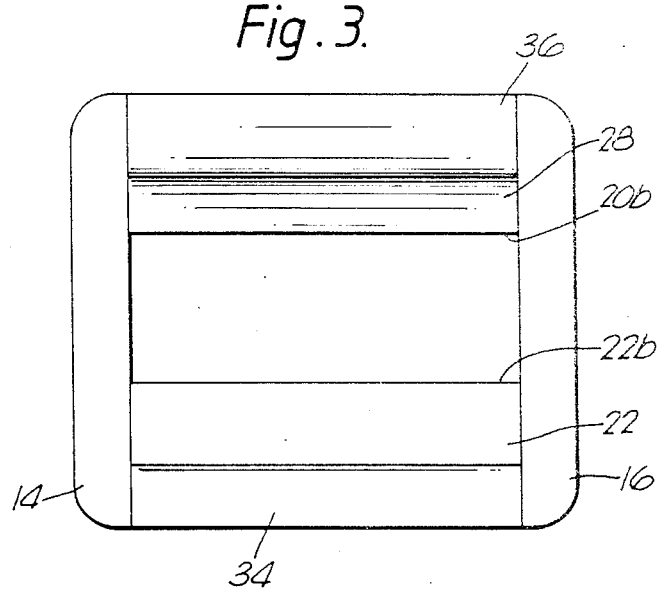
FIG. 3 is a view of the nozzle of FIG. 1, looking forward.

Referring to FIGS. 1 to 3 there is shown a nozzle 10 which is provided at the downstream end of the jet pipe 12 of a gas turbine aero engine, to receive the efflux of gases from the turbines of the engine. The nozzle comprises a pair of spaced side walls 14, 16.

Each sidewall is provided with a trackway 18, which is generally "U" shaped with the legs of the "U" pointing forwards. The trackway is in the form of a rectangular cross section recess. Two sets of flaps 20, 22 are provided.

The uppermost set of flaps 20 comprise five members 20(a) (there may be more, or less, than five), which are pivotally connected together by hinges 24. The lowermost set of flaps 22 comprises five members 22a (again there can be more or less than five), which are pivotally connected by hinges 24. Each hinge projects beyond the side edges of each member 20a, 20(a) and carries a roller which engages in the trackway 18.

The foremost member 20a, 22a of each set is connected to an actuator which is driven by an air motor, or by an hydraulic jack, shown schematically by the reference numeral 26. The actuator operates to push and pull each set of flaps, separately or in unison, along the trackway 18 to form an effective nozzle. All flaps co-operate with as good a seal as possible between each other and between the flaps and the side walls 18 to reduce leakage.

The nozzle 10 has an upper and lower fixed wall 32, 34 respectively. The lower fixed wall (32) terminates in a plane which lies upstream of the downstream edge of the lower fixed wall (34). However the lower set of flaps (22) can be moved rearwards beyond the downstream edge of the lower fixed wall (34) when the nozzle is set to discharge rearwards.

The downstream edge of the rearmost flap 20(b) of the upper set co-operates with the downstream edge of the rearmost flap 22(b) of the lower set to define the throat of the nozzle.

A larger flap 28, which defines an extension of the nozzle downstream of the throat is pivotally connected at its upstream end to the downstream region of the rearmost flap 20 of the upper set. An independently operable actuator 30 is provided to rotate the flap 28 about its axis of pivotal connection to the flap 20(a). The flap (28) defines a single expansion ramp pressure recovery divergent section of the nozzle and can be moved independently or in synchronisation with the movement of the flaps 20, 22 to maintain an optimum divergence angle for all areas of the throat.

The side walls extend sufficiently rearwards to enable the flaps 20, 22 and 28 to co-operate with the side walls in all positions of the flaps.

The trackway 18 is shaped to form a substantially symmetrical convergent region immediately upstream of the throat when the upper and lower sets of flaps 20, 22 are in the position shown in FIG. 1 (i.e. discharging rearwardly for forward thrust). With the nozzle in the forward thrust position and with upper and lower sets of flaps 20,22 co-operating to define a convergent upstream region of the throat, the throat area can be varied by simultaneously moving the upper and lower sets rearwards or forwards.

The upper fixed wall 32 is provided with an outer pivotted extension 36 which is pivotally connected to the downstream end of the flap 28. This extension enables one to fair the external free stream air flow when the flap 28 is moved.

Referring to FIG. 4, to vector the thrust produced by the nozzle (eg upwards thrust), the lowermost set of flaps 22 are retracted forwards and the upper set of flaps 20 are moved rearwards so that they move around the curved trackway and leave an opening pointing downwards. In this position the flap 28 is pulled downwards and no longer defines a divergent expansion ramp. Simultaneously the extension 36 to the outer fixed wall 32 drops down with the flap 28. Ground clearances in the VTOL mode of flight can thus be greatly improved.

As stated above, there may be more, or less, than five flaps 20, 22 in each set of flaps, providing that the trackway 18 is suitably shaped to bring about the desired shape of the region of the nozzle upstream of the throat.

Figure 5:
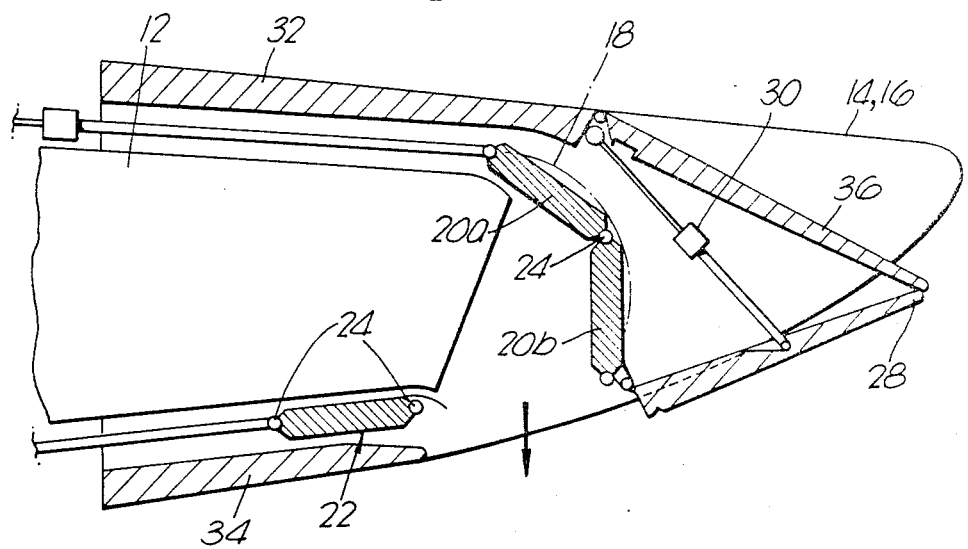
FIG. 5 is a cross-sectional view of a second nozzle constructed in accordance with the present invention.

Referring to FIG. 5 there is shown one such nozzle in which there are two members 20 in the upper set and one member 22 in the lower set. This enables a much lighter weight nozzle to be built. Apart from the numbers of members 20, 22 and the shape of the trackway 18 (which in fact in FIG. 5 consists of two seperable recesses in each side wall 18), the nozzle is similar in design to the nozzle of FIG. 1.

It will be appreciated that the nozzles of FIGS. 1 and 5 can be set to various positions over a range extending from a direction 20° upwards from the horzontal position to 90° downwards. For normal forward flight with vectoring over a range of 20° up or 20° down (for attitude and pitch control) the flap 28 can be set to define a convergent divergent nozzle with the benefit of producing greater thrust than when the nozzle is simply a convergent nozzle.

We claim:
1. A propulsion nozzle for mounting an outlet end of a jet pipe of a gas turbine engine, the nozzle comprising:
  (a) two mutually confronting spaced fixed walls each of which is provided with a trackway;
  (b) two mutually confronting spaced movable walls having ends which are located in and movable along a path defined by said trackways, the movable walls each comprising a plurality of members, interconnected by pivotal means, which extend transverse to the fixed walls, said movable walls cooperating with the fixed walls to define a convergent part and throat of the nozzle; said nozzle including actuating means for moving said movable walls along said pathway between a first position which corresponds to a first mode of operation wherein said members of said movable walls define a convergent portion of the nozzle with the throat of the nozzle facing in a rearward direction relative to the engine to produce forward thrust, and a second position corresponding to a second mode of operation wherein the said members are caused to define a convergent nozzle with the throat facing in a direction which is angled relative to said rearward direction to vector the direction of thrust; and
  (c) a flap pivotally connected at its upstream end to a downstream end of one of the movable walls and operable in at least one mode of operation to cooperte with the fixed walls to define a divergent expansion ramp downstream of the throat of the nozzle.

2. A nozzle according to claim 1 wherein the flap downstream of the throat defines a divergent expansion ramp downstream of the throat of the nozzle only in the first mode of operation.

3. A nozzle according to claim 1 wherein there is provided an outer fixed wall which lies alongside each of the movable walls and the outer fixed wall which lies alongside that which has the flap connected thereto is provided with a pivotally mounted exension at its downstream end and the extension cooperates with the flap to fair the external free stream air flow over the outside of the nozzle.

4. The nozzle claimed in claim 1 wherein said upstream end of said flap is movable along at least a portion of said path together with said one of said movable walls, said nozzle including independent actuating means for pivoting said flap relative to said downstream end of said one of said movable walls between a first position wherein said flap is operable to cooperate with said fixed walls to define a divergent expansion ramp downstream of the throat of said nozzle when said movable walls are in said first position and movable to a second position when said movable walls are in said respective second position wherein said flap is generally out of the discharge direction of said nozzle.

* * * * *